May 16, 1933.  T. LEWIN  1,909,773
MOLDING OR CASTING APPARATUS
Filed Oct. 31, 1930   5 Sheets-Sheet 1
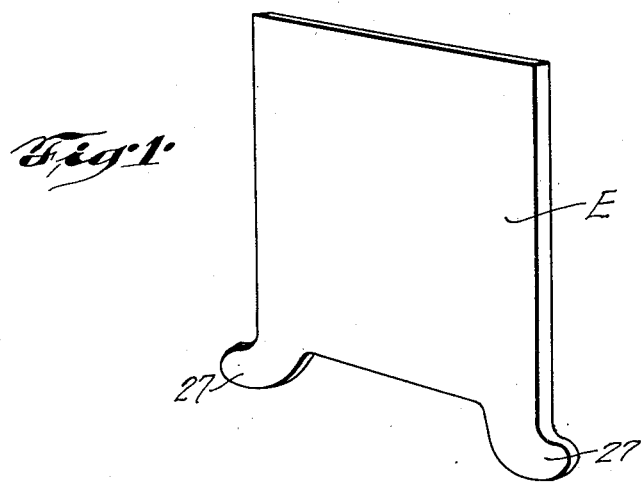
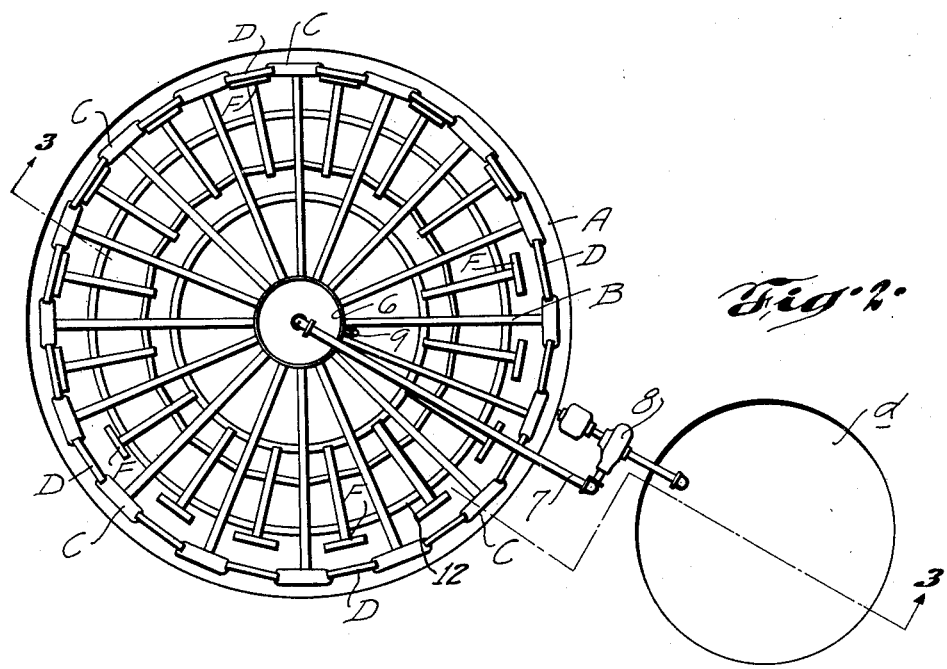
INVENTOR
Tannie Lewin
BY
ATTORNEY

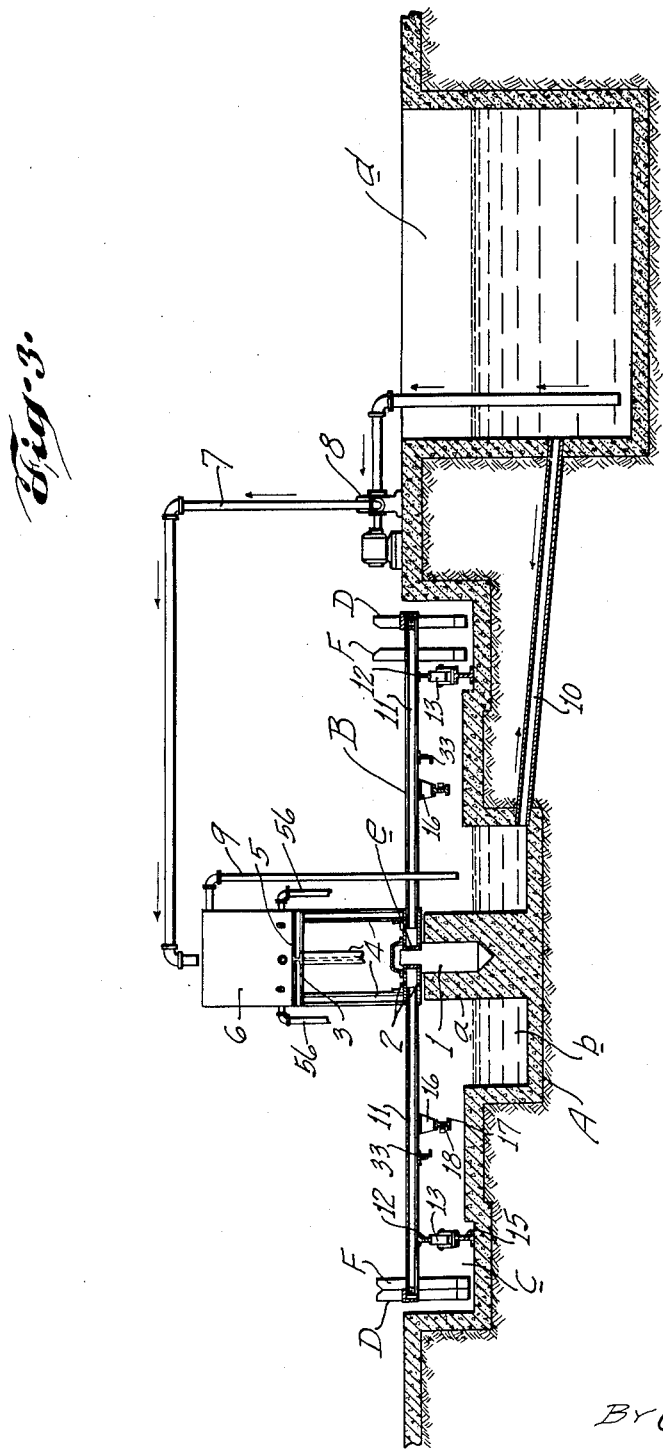

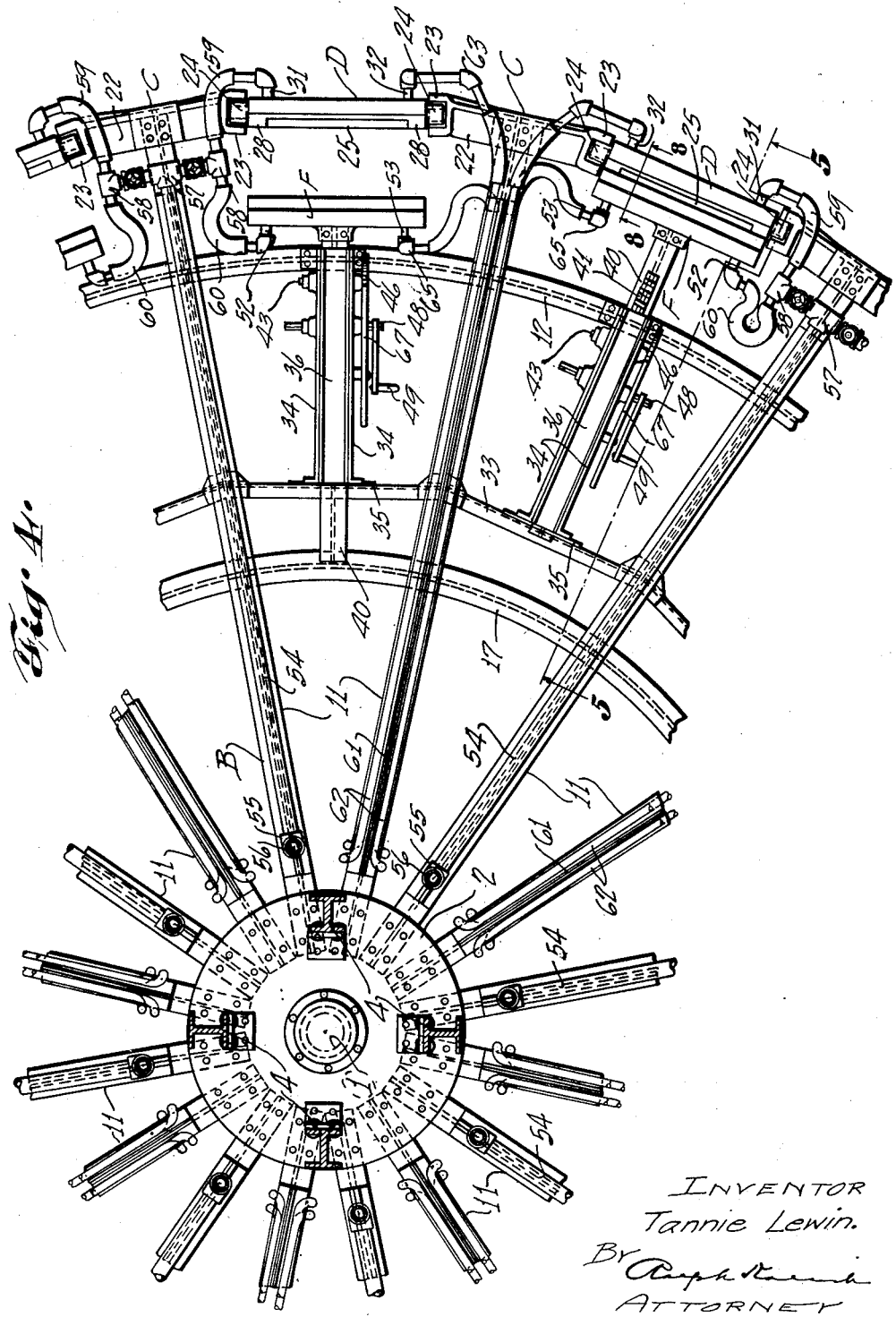

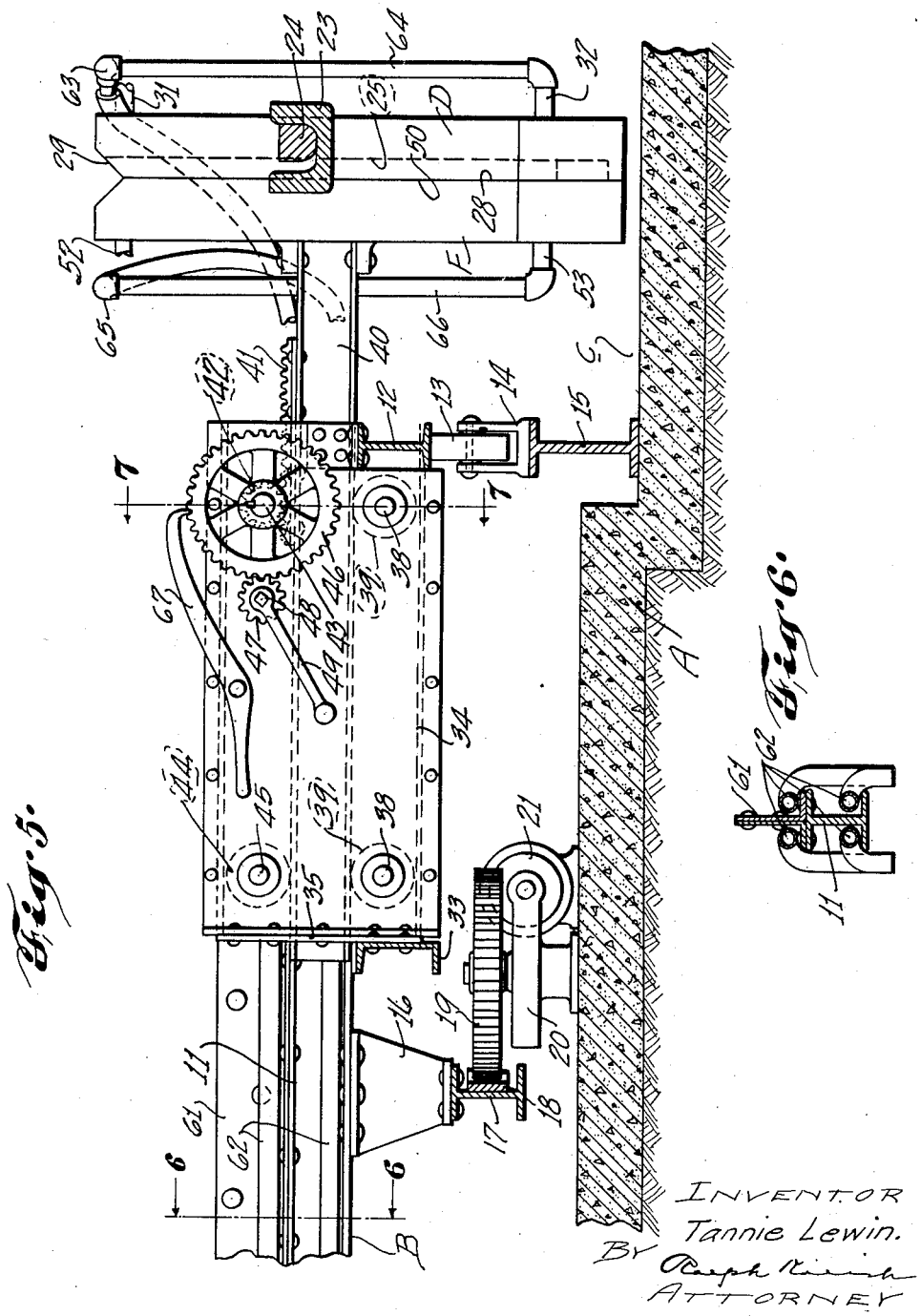

May 16, 1933.                T. LEWIN                    1,909,773
                    MOLDING OR CASTING APPARATUS
                      Filed Oct. 31, 1930           5 Sheets-Sheet 5
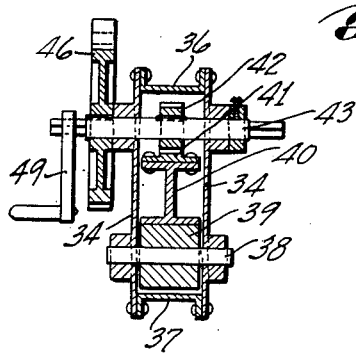
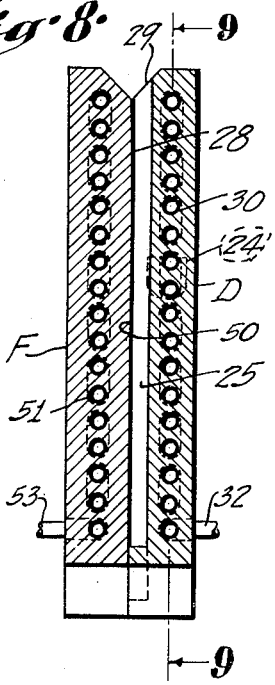
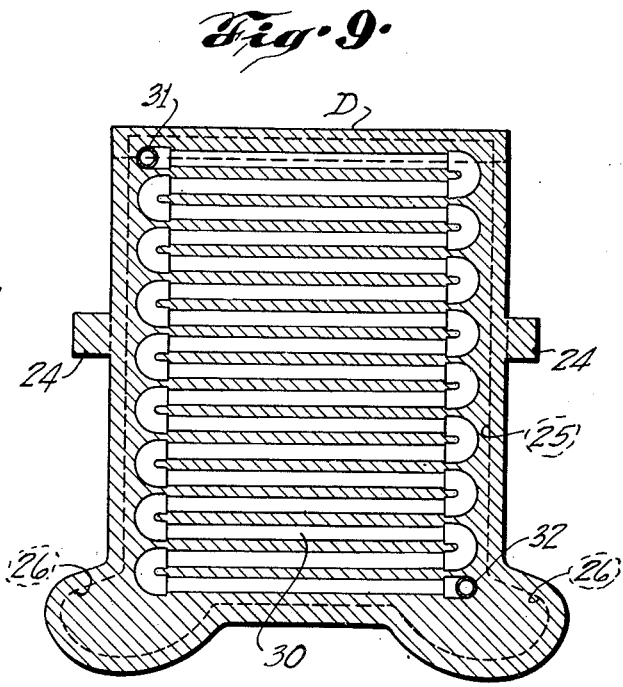
INVENTOR
Tannie Lewin.
BY
ATTORNEY Patented May 16, 1933

1,909,773

UNITED STATES PATENT OFFICE

TANNIE LEWIN, OF UNIVERSITY CITY, MISSOURI, ASSIGNOR OF ONE-HALF TO WILLIAM LEWIN, OF UNIVERSITY CITY, MISSOURI

MOLDING OR CASTING APPARATUS

Application filed October 31, 1930. Serial No. 492,379.

This invention relates generally to molding or casting apparatus and has for its chief object the provision of apparatus for economically in cost and labor and with speed and facility producing substantially smooth molded anodes and other special forms of uniform thickness, dimensions, and configuration.

And with the above and other objects in view, my invention resides in the novel features of form, construction, arrangement, and combination of parts hereinafter described and pointed out in the claims.

In the accompanying drawings—

Figure 1 is a perspective view of an anode-form as molded and produced by apparatus of my invention;

Figure 2 is a reduced plan of a molding apparatus embodying my invention;

Figure 3 is a sectional view of the apparatus taken approximately on the line 3—3, Figure 2;

Figure 4 is an enlarged fragmental sectional plan view of the apparatus;

Figure 5 is an enlarged detail sectional view of the apparatus taken approximately on the line 5—5, Figure 4;

Figures 6 and 7 are detail sectional views of the apparatus taken approximately on the lines 6—6 and 7—7, Figure 5, respectively;

Figure 8 is a similar view taken approximately on the line 8—8, Figure 4; and

Figure 9 is also a similar view taken approximately on the line 9—9, Figure 8.

Referring now more in detail and by reference characters to the drawings, five sheets, which illustrate a preferred embodiment of my invention, A designates the foundation structure, which is preferably constructed of concrete or other suitable material and which preferably has the formation in transverse section best seen in Figure 3, comprising, as there shown, an upstanding portion or pillar $a$, concentrically around which, in turn and in suitable diametrically spaced relation, is a well $b$ and a track-way $c$, and disposed radially outwardly from the track-way $c$, is a reservoir $d$.

Seated and for the most part embedded in the pillar or post $a$, is a vertically disposed pivot-pin 1, and journaled, as at $e$, upon the pin 1 for rotation horizontally over the foundation A, is a wheel-structure B comprising a pair of lower horizontally disposed substantially registering disks 2, fixed to and upstanding from which is an annular series of vertically disposed I-beams or other suitable structural members 4. Fixed in cross-relation on the beams 4, are suitable beams 3, and rested on and rigidly fixed at its bottom 5 to the beams 3, is an open-upper-end tank 6. Having its intake-end suitably disposed in the reservoir $d$ and its discharge-end suitably disposed over the upper-end of the tank 6, as best seen in Figure 3, is a pipe whereby water contained in the reservoir $d$ is supplied, through the instrumentality of a suitably interposed pump 8, into the tank 6. Leading from the tank 6 into the well $b$, is an overflow pipe 9, the well $a$, in turn, having return communication with the reservoir $d$ through a suitably embedded drain-pipe or passage 10.

The disks 2 are suitably spaced vertically, and having their respective inner ends disposed between, and suitably riveted or otherwise permanently fixed to, the hub-disks 2, is a series of radially outwardly presented spokes 11 preferably in the form of I-beams, connected one to the other in wheel-formation adjacent their respective outer ends by an annular rim 12, as it may be designated, preferably in the form of an I-beam, as best seen in Figures 3 and 5, which is adapted for rolling engagement and support on an annular series of rollers 13 suitably mounted for rotation in respective bearings 14 supported on an annular track 15 disposed in the foundation trackway $c$.

Suitably riveted or otherwise fixed to, and depending from, the respective spokes 11, and disposed in an annular series diametrically inwardly from the rim 12, are hangers 16, and suitably riveted to, and, in turn, depending from, the hangers 16, is an annular structural member 17 preferably in the form of an I-beam, as best seen in Figures 3 and 5, upon the inner face of the web of which is fixed a ring-gear or rack 18 adapted for meshing driven engagement with a gear 19 adapted, in turn, for actuation through suitable reducing mechanism 20 by a motor or other prime-mover 21 suitably mounted on the foundation A, as best seen in Figure 5.

Suitably riveted or otherwise rigidly fixed to and upon the outer end of, and disposed approximately at right angles to, each of the spokes 11, is a casting C preferably ribbed or otherwise suitably reinforced, as at 22, and provided upon its opposite side margins with outwardly-presented opposed sockets 23 approximately U-shape in section, as best seen in Figure 5, each adapted to somewhat loosely seat for swingable movement a supporting lug 24 projecting laterally from a member or mold D, the several castings C being each of such relative proportions that the several molds D, when respectively supported by its opposed lugs 24 in an opposed pair of the sockets 23, are disposed vertically in an annular series substantially concentric with, and with their respective inner faces presented inwardly toward, the pivot post $a$, each respective mold D being thus hung or suspended angularly with respect to, and approximately midway of, a pair of the spokes 11, for purposes presently appearing, as best seen in Figure 5.

Each mold D is constructed of any suitable material, preferably copper, and in its inner face is recessed or chambered in depth and contour in conformity with the desired thickness, contour or shape, and configuration of the particular form to be cast or molded. The present apparatus is particularly adapted for the production of anode-forms, such as the form E shown in Figure 1, and accordingly, in the present instance, each of the molds D is of the required size and dimensions and has upon its inner face an open-top recess or chamber, as at 25, conforming in depth and contour to the desired thickness and contour of the particular anode-form E, each recess 25 also, to such end, including opposite lower corner-continuations 26 for the formation of the opposed anode-ears 27, and for convenience in pouring, as presently appearing, the side walls 28 of each recess or chamber 25 are preferably at their upper margin chamfered or beveled, as at 29.

Each mold D is further, in the formation or casting or molding thereof, constructed to embody a wholly enclosed or embedded coil 30 having an inlet 31 and an outlet 32 presented through, and respectively disposed adjacent the top and bottom margins of, the outer face of the mold-body, as best seen in Figures 4, 5, 8, and 9, the coil 30 preferably including such plurality of convolutions as to extend substantially throughout the areal dimensions of the particular mold.

Suitably riveted or otherwise fixed to the several spokes 11 and disposed in an annular series approximately concentrically intermediate the rim 12 and the ring 17, are cross preferably channel-shaped members 33, and projecting radially of the structure intermediate the respective spokes 11, are vertically presented plates 34 disposed in parallel suitably spaced pair-relation and fixed at their respective inner ends, by means of gussets or the like 35, to the respective cross-members 33. At their respective outer ends, the several pairs of plates 34 are shaped to rest upon, and are riveted or otherwise fixed to, the rim 12, as best seen in Figure 5, each pair of the plates 34 being rigidly tied together in in the formation of a plunger-way by opposed channels 36, 37, having their respective flanges presented outwardly, as best seen in Figure 7.

Suitably supported by each respective pair of the plates 34, are cross-shafts 38, and journaled for rotation on the shafts 38 intermediate the respective plates 34 are rollers 39 for rollably supporting for reciprocation the radially disposed preferably I-beam plunger 40 of a ram F, it being understood, of course, that the space between the respective plates 34 has suitable openings at its opposite radial ends to permit of free reciprocations of the ram-plunger 40 for engagement of the head or ram proper F with, or disengagement of the same from, the respective or registering mold D.

Fixed longitudinally on the upper flange of each ram-plunger 40, is an upwardly presented rack 41, having meshing engagement with which is a gear 42 fixed on a shaft 43 journaled for rotation in, and adjacent the outer margin of, the respective plates 34, a third ram-engaging or retaining roller 44 being disposed for rotation intermediate, and adjacent the inner margin of, the plates 34 on a shaft 45 likewise suitably supported by said plates for the purpose. And also fixed on the shaft 43, is a gear 46, with which is adapted to mesh a pinion 47 mounted on a stub-shaft 48 suitably supported by one of the plates 34 of each respective pair. The shaft 43 is adapted for rotary actuation by means of a suitable crank 49, and it will be evident that, as the shaft 43 is so actuated in one or the other direction, the plunger 40 will be correspondingly shifted radially outwardly or inwardly of the structure for, as I have stated, engagement of the ram F with, or disengagement of the same from, the respective or registering mold D.

For co-operation of the several rams F with the respective molds D, each ram F, preferably also constructed of copper, conforms in size and dimensions with its respective companion mold D and in the present instance has a flat outer face 50 adapted, when the ram is outwardly shifted, to flatwise abut against the bottom and side walls of the recess 25 of the respective mold D, to complete the anode casting chamber, as best seen in Figure 8. Each ram F is likewise, in the formation thereof, constructed to embody a wholly enclosed or embedded coil 51 substantially in all respects similar to the mold-coil 30 and similarly having an inlet 52 and an outlet 53 presented through, and respectively disposed adjacent the top and bottom margins of, the inner face of the ram-body, as shown.

Each alternate spoke 11 longitudinally suitably carries a pipe-member 54, which at its inner end is provided with a suitable L 55 for communicating connection with a respective pipe 56 leading and depending from the tank 6. At its outer end, each pipe 54 has communicating connection with a suitable T-coupling 57, each branch of which, in turn, has preferably valve-controlled communicating connection, as shown, with a second T-coupling 58, each branch of the second coupling 58 having communication through respective and suitable elongated flexible hose-connections 59, 60, with the inlets 31 and 52, respectively, of a mold D and its respective companion or co-operating ram F, all as best seen in Figure 4. Thus each pipe 54 is adapted for the water-supply of a pair of the molds D and their rams F.

Each of the remaining spokes 11 is preferably provided longitudinally with a pair of back-to-back angles 61, and suitably carried longitudinally on the flanges of each such spoke 11 and its angles 61, as best seen in Figures 4 and 6, are four individual pipe-members 62 having their respective inner ends disposed adjacent to, and for discharge into, the well b. At their respective outer ends, two of the pipes 62 have communicating connection through couplings 63 with stand-pipes 64 leading from and having, in turn, communicating connection with the outlets 32 of said respective two molds D, while the other two of said pipes 62 have communicating connection through similar couplings 65 with like stand-pipes 66 leading from and having, in turn, communicating connection with, the outlets 53 of said respective two rams F.

The apparatus being so constructed, it will be obvious that, through the driving-connection between the motor 21 and the rack 18, rotary actuation, intermittently and through selected distances, of the wheel-structure B, including the several molds D and their complementary rams F, and the tank 6 and the mold water supply and circulating connections, is conveniently under the control of the motor-operator.

While not here shown, the apparatus, as will be understood, is preferably located adjacent the pouring-outlet of a furnace, retort, or the like, and the wheel structure B is intermittently caused to travel on the track 15 to locate the molds D successively in position to receive a charge of the molten metal in their respective recesses or chambers 25. Prior, however, to pouring of the molten metal, the particular ram F is shifted outwardly for flatwise engagement at its face 50 with the side and bottom walls of said recess 25 for completing the casting chamber of the particular mold, as seen in Figure 8, the ram F being releasably secured in such position through engagement with the gear 46 of a dog 67 pivotally mounted for the purpose on the adjacent plate 34. The molten metal is now permitted to flow or discharge to the proper amount in the so provided and located casting-chamber, whereupon the wheel-structure B is again caused to travel to now dispose a second casting-chamber, provided by the succeeding mold D and its outwardly shifted and locked ram F, in position to receive a charge, the wheel-structure B being so intermittently caused to travel and the several molds D and their complementary rams F being thus successively brought into registration with the furnace for receiving their respective charge. During such travel of the successively charged molds, the cast metal cools and hardens or solidifies, and as the several charged molds reach in succession a predetermined location, the respective dogs 67 are actuated to release position, and the respective rams F shifted inwardly, permitting most convenient removal of the respective molded forms, which, in the present instance, as I have stated, have the anode shape or conformation best seen in Figure 1.

And during such molding operations, the cooling water from the elevated tank 6 flows, under the gravity head so provided, through the connections described into and through the molds D and their complementary rams F, eliminating warping and cracking and enabling the molds D and rams F to retain, under the heat of the molten metal, their proper molding formation. And in addition, the molds D are permitted, by means of their socket-seated lugs 24, to swingably shift to flatwise meet and for tight joint engagement with the projected rams F, compensating thus for wear.

It will be noted further that the stand-pipes 64, 65, are of a length to extend at their upper ends substantially to the plane of the upper margin of the molds D and rams F, so that, should circulation of water from tank 6 be accidentally or otherwise interfered with or prevented, the several molds D and rams F will continue to contain sufficient cooling water, the contained water only flowing therefrom under pressure of the entering water, as will be understood.

My new apparatus has been found exceedingly efficient in the performance of its functions, and by my apparatus I am enabled to economically effect quantity or mass production of smooth-face anodes with uniformity in their thickness and other dimensions. And it is to be understood that changes and modifications in the form, construction, arrangement, and combination of the several parts of my new apparatus may be made and substituted for those herein shown and described without departing from the nature and principle of my invention.

Having thus described my invention, what I claim and desire to secure by Letters Patent is:

1. Molding apparatus comprising a support, a wheel-structure disposed horizontally for rotation on the support, a plurality of pairs of co-operating molding-members mounted in an annular series on and annularly movable with the wheel-structure, each of said mold-members comprising a coil having inlet and outlet openings, and means for circulating coiling fluid through the coils, said means including a tank supported over and rotatable with the wheel-structure, a series of supply pipes disposed on and movable with the wheel-structure and leading from the tank to the inlets of the respective pairs of molding-members, and a series of discharge-pipes also disposed on and movable with the wheel-structure and having communicating connection with the outlets of the respective pairs of mold-members.

2. Molding apparatus including, in combination, a hub, beams radiating from the hub, a mold supported in upright position by and disposed intermediate the beams, the mold having its inner side face presented toward the hub and having a recess in its said side face partially providing a casting-chamber, a complementary ram reciprocably slideable in a radial path intermediate the beams for engagement with the mold over said recess for completing the casting chamber, cooling coils embedded in the mold and ram having respective inlet and outlet openings, and means for circulating cooling water through said coils, said means comprising a tank supported by the hub and disposed in a plane elevated above the plane of said coils, and communicating pipe-connections between the tank and the respective inlet openings of the ram and mold.

3. Molding apparatus including, in combination, a wheel-structure comprising a hub and an annular series of beams radiating from the hub, a plurality of molds disposed respectively intermediate the beams and supported by the beams in an aligning annular upright series, said molds having their respective inner side faces presented toward the hub and each having a recess in its said side face partially providing a casting chamber, a series of complementary rams reciprocably slideable in respective radial ways supported by and disposed intermediate the beams for engagement with the respective molds over their said recesses for completing the casting-chamber thereof, coils embedded in the respective molds and rams, each coil having inlet and outlet openings, means for rotarily actuating the wheel-structure, and means for circulating cooling water through the several coils, said means comprising a tank supported by and rotarily movable with the wheel-structure, and pipe connections between the tank and the inlet openings of the several coils.

In testimony whereof, I have signed my name to this specification.

TANNIE LEWIN.